US006744913B1

United States Patent
Guest et al.

(10) Patent No.: US 6,744,913 B1
(45) Date of Patent: Jun. 1, 2004

(54) SYSTEM AND METHOD FOR LOCATING IMAGE FEATURES

(75) Inventors: Clyde Maxwell Guest, Plano, TX (US); John Mark Thornell, Plano, TX (US)

(73) Assignee: Semiconductor Technology & Instruments, Inc., Plano, TX (US)

( * ) Notice: Subject to any disclaimer, the term of this patent is extended or adjusted under 35 U.S.C. 154(b) by 0 days.

(21) Appl. No.: 09/551,106

(22) Filed: Apr. 18, 2000

(51) Int. Cl.[7] .................................................. G06K 9/00
(52) U.S. Cl. ........................ 382/145; 382/199; 382/218; 348/126
(58) Field of Search .............................. 382/145, 149, 382/225, 190, 199, 218, 274; 348/126, 188; 356/394; 438/14, 33, 16

(56) References Cited

U.S. PATENT DOCUMENTS

| | | | | |
|---|---|---|---|---|
| 4,200,861 A | * | 4/1980 | Hubach et al. | 194/905 |
| 5,119,436 A | * | 6/1992 | Holdgrafer | 382/146 |
| 5,164,994 A | * | 11/1992 | Bushroe | 378/58 |
| 5,455,870 A | * | 10/1995 | Sepai et al. | 382/147 |
| 5,495,424 A | | 2/1996 | Tokura | 364/507 |
| 5,495,535 A | * | 2/1996 | Smilansky et al. | 382/145 |
| 5,498,767 A | * | 3/1996 | Huddleston et al. | 438/599 |
| 5,566,877 A | * | 10/1996 | McCormack | 348/126 |
| 5,581,632 A | * | 12/1996 | Koljonen et al. | 382/150 |
| 5,729,346 A | * | 3/1998 | Joo | 356/394 |
| 5,760,829 A | * | 6/1998 | Sussmeier | 348/187 |
| 5,851,848 A | * | 12/1998 | Balamurugan | 438/33 |
| 5,974,169 A | * | 10/1999 | Bachelder | 382/151 |
| 6,096,567 A | * | 8/2000 | Kaplan et al. | 324/758 |
| 6,122,397 A | * | 9/2000 | Lee et al. | 382/149 |
| 6,137,893 A | * | 10/2000 | Michael et al. | 382/103 |
| 6,151,406 A | * | 11/2000 | Chang et al. | 348/126 |
| 6,236,746 B1 | * | 5/2001 | Chamberlain et al. | 382/145 |
| 6,246,788 B1 | * | 6/2001 | Pattikonda et al. | 382/147 |
| 6,252,981 B1 | * | 6/2001 | Guest et al. | 382/149 |
| 6,272,247 B1 | * | 8/2001 | Manickam et al. | 382/217 |
| 6,288,782 B1 | * | 9/2001 | Worster et al. | 356/394 |
| 6,381,366 B1 | * | 4/2002 | Taycher et al. | 382/199 |
| 6,477,275 B1 | * | 11/2002 | Melikian et al. | 382/217 |
| 6,539,106 B1 | * | 3/2003 | Gallarda et al. | 382/149 |

\* cited by examiner

*Primary Examiner*—Jayanti K. Patel
*Assistant Examiner*—Sheela Chawan
(74) *Attorney, Agent, or Firm*—Christopher J. Rourk; Akin Gump Strauss Hauer & Feld, LLP

(57) ABSTRACT

A system for locating features in image data is provided. The system includes a first component system. The first component system compares first component data, which can be pixel data of a first user-selected component of the feature, to first test image data, which can be selected by scanning image data of a device, such as a die cut from a silicon wafer. The system also includes second component system that is connected to the first component system, such as through data memory locations of a processor. The second component system compares second component data to second test image data if the first component system finds a match between the first component data and the first test image data. The second test image data is selected based upon the first test image data, such as by using a known coordinate relationship between pixels of the first component data and the second component data.

13 Claims, 5 Drawing Sheets

013377.0063

013377.0063

013377.0063

013377.0063

013377.0063

SYSTEM AND METHOD FOR LOCATING IMAGE FEATURES

BACKGROUND

Image data processing is used to inspect items during and after the manufacturing process. Such image data is typically gathered using a digital camera or other device that digitizes image data within the focal field of the device. The digitized image data is then analyzed, either manually or by software systems or other digital systems.

In cases where the image data is more complex, it is often necessary to manually review the image data before software systems can be used. For example, image data of dies that have been formed on a silicon wafer may be inspected by software systems. Nevertheless, areas of the die may have to be manually selected that cannot be analyzed by the software systems, such as areas that contain image data that will cause the software systems to register a false indication of a problem. In other circumstances, it is easier to select areas that are to be inspected, rather than areas that are to be excluded from inspection.

Therefore, although analysis of image data by software systems is useful, manual selection of image data may still be required. One area in which such manual selection is required is the selection of certain repetitive features, such as bond pads of a silicon wafer die. Because the image data of border areas surrounding bond pads can vary significantly, analysis of the image data by a software system to locate bond pads can result in an unacceptable number of false positives. As a result, it is necessary to manually identify each bond pad on a reference die before a software system can be used to analyze the bond pad image data to determine whether damage or other unacceptable conditions exist.

SUMMARY OF THE INVENTION

In accordance with the present invention, a system and method for locating features in image data are provided that overcome known problems with locating features.

In particular, a system and method for a locating features in image data are provided that allow discrete portions of image data to be used to search for the features such that the number of instances in which a feature is improperly identified is minimized.

In accordance with an exemplary embodiment of the present invention, a system for analyzing image data is presented. The system includes a first component system. The first component system compares first component data, which can be pixel data of a first user-selected component of the feature, to first test image data, which can be selected by scanning image data of a device, such as a die cut from a silicon wafer. The system also includes second component system that is connected to the first component system, such as through data memory locations of a processor. The second component system compares second component data to second test image data if the first component system finds a match between the first component data and the first test image data. The second test image data is selected based upon the first test image data, such as by using a known coordinate relationship between pixels of the first component data and the second component data.

The present invention provides many important technical advantages. One important technical advantage of the present invention is a feature location system and method that do not generate incorrect results because of non-uniform image data that may lie in the border of the feature. Such non-uniform image data may be included in a test image that is used to identify the feature, and can result in incorrect results. The present invention allows components of features to be selected from areas that have minimal non-uniform image data, thus minimizing the number of incorrect results.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
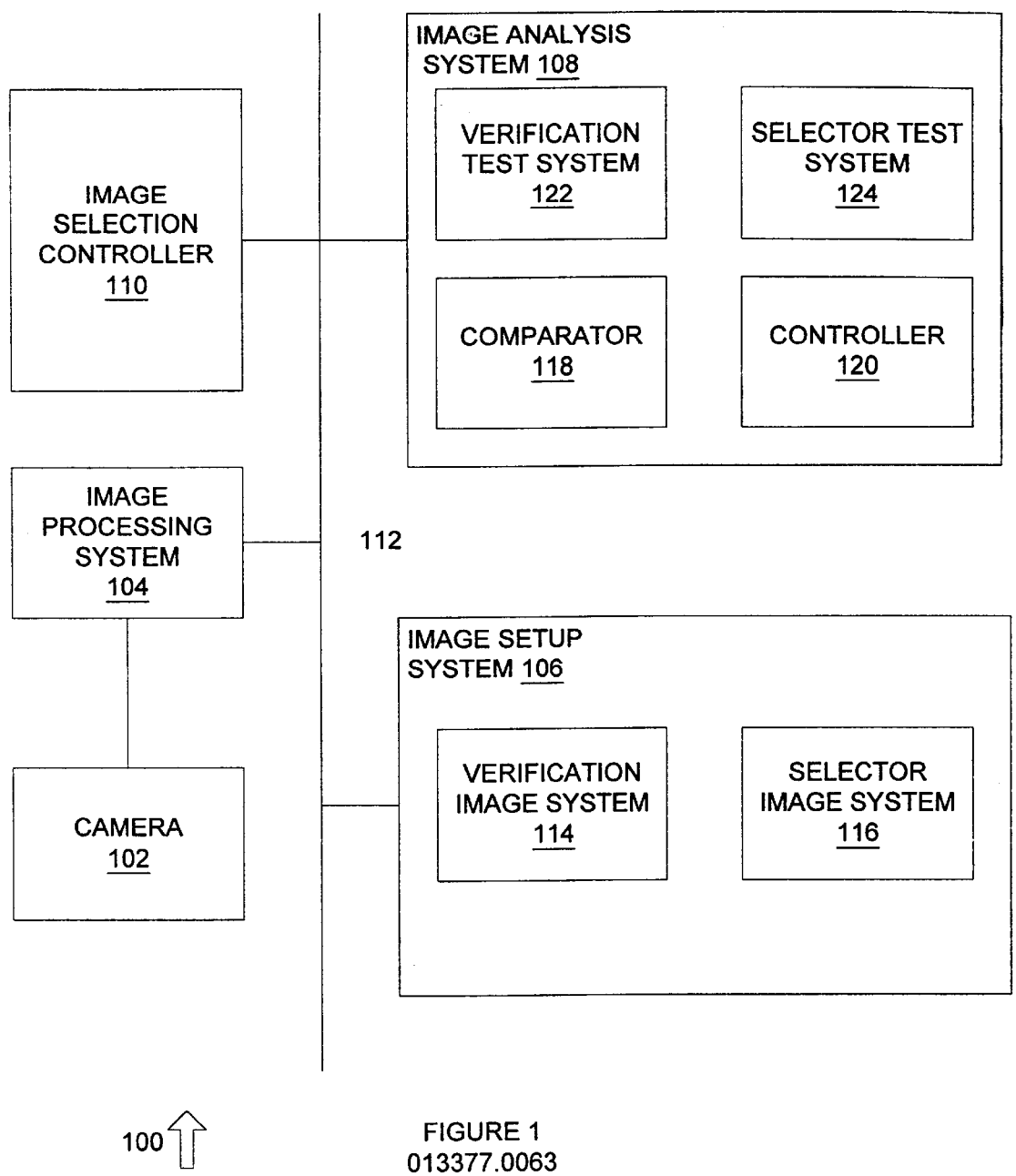
FIG. 1 is a diagram of a system for analyzing image data in accordance with an exemplary embodiment of the present invention.

In the description which follows, like parts are marked throughout the specification and drawing with the same reference numerals, respectively. The drawing figures may not be to scale and certain components can be shown in generalized or schematic form and identified by commercial designations in the interest of clarity and conciseness.

FIG. 1 is a diagram of a system 100 for analyzing image data in accordance with an exemplary embodiment of the present invention. System 100 allows repetitive features of image data to be selected by using two or more user-selected components of a reference feature that are present on each of the other features of the image data, which eliminates problems with feature recognition that may be caused by non-uniform image data variations that occur on some or all of the features.

System 100 can be implemented in hardware, software, or a suitable combination of hardware and software, and can include one or more software systems operating on a silicon wafer inspection system that includes a processor or other suitable control system, such as the WAV 1000 Wafer Inspection System available from Semiconductor Technologies and Instruments of Plano, Tex. As used herein, a software system can refer to one or more lines of code, one or more objects, one or more agents, one or more subroutines, one or more separate software programs operating on different processing platforms, two or more lines of code operating in two or more respective software programs, or other suitable combinations or implementations of software code. In one exemplary embodiment, a software system includes one or more lines of code in a general-purpose software program, such as an operating system software program, and one or more lines of code in a specific-purpose software program.

System 100 can be used to inspect image data in order to identify or locate user-selected features of the image data. System 100 includes camera 102. Camera 102 can be a digital imaging device having an array of picture elements, or "pixels." For example, camera 102 can include a 1000×1000 pixel digital imaging capability with a maximum resolution of 5 micrometers for each pixel. Camera 102 can digitize an image in the field of view of camera 102, such as by assigning a contrast value to each pixel of the pixel array. This contrast value can include the relative intensity of light received at the corresponding pixel, such as a value ranging from 0 to 255.

Camera 102 is coupled to image processing system 104. As used herein, the term "couple" and its cognate terms such as "coupled" and "couples" can refer to a physical connection (such as through a copper conductor), a virtual connection (such as through randomly assigned memory locations in a data memory device), a logical connection (such as through logical devices of a semiconducting circuit), a combination of such connections, or other suitable connections. In one exemplary embodiment, systems and components can be coupled to other systems and components through intervening systems and components, such as through the operating system of a general purpose computing platform.

Image processing system 104 can be implemented in hardware, software, or a suitable combination of hardware and software, and can be one or more software systems operating on a general-purpose computing platform. Image processing system 104 receives the pixels of digital data from camera 102 and stores the pixels in a suitable data file. In one exemplary embodiment, image processing system 104 stores bitmap data for each image, where such bitmap data includes the contrast data for each pixel. The bitmap data would thus include pixel brightness data for each of the 1,000,000 pixels in a 1000×1000 pixel array. Image processing system 104 assembles the pixel data into a file according to predetermined file data formats.

System 100 also includes image setup system 106, which is coupled to image processing system 104 by communications medium 112. Image setup system 106 can be implemented in hardware, software, or a suitable combination of hardware and software, and can be one or more software systems operating on a general-purpose software or processor platform. Communications medium 112 can be a copper conductor, data bus, operating system, or other suitable communications media.

Image setup system 106 includes verification image system 114 and selector image system 116, each of which can be implemented in hardware, software, or a suitable combination of hardware and software, and which can be one or more software systems operating on a general purpose processing platform. Image setup system 106 is used to select components of a reference image that can be used to identify recurring features in the image data received from camera 102 and image processing system 104. Image setup system 106 can receive user-entered data that is used to identify one or more components of a feature of the image data, where such parts are used to identify recurring features in the image data.

For example, selector image system 116 can be used to receive user-entered commands that identify a first component of a feature. In this exemplary embodiment, the feature can be a square bond pad of a semiconducting circuit, where the bond pad is used to attach a lead to the semiconducting circuit. Selector image system 116 is used to select a component of the reference bond pad image data that is present on each bond pad feature of the image data. Likewise, verification image system 114 is used to select a second component of the reference bond pad image data that can be used for verification purposes. The spatial relationship between the selector image and the verification image can then be determined from pixel coordinate data, such that the expected location of the verification image in test image data can be readily determined from the coordinate relationship between the verification image and the selector image after a match is found between the selector image and the test image data.

System 100 further includes image analysis system 108, which also includes verification test system 122, selector test system 124, comparator 118, and controller 120. Each of these systems can be implemented in hardware, software, or a suitable combination of hardware and software, and can be one or more software systems operating on a general-purpose computing platform. Image analysis system 108 interfaces with image setup system 106 and image processing system 104 over communications medium 112 to perform analysis of image data received from image processing system 104. For example, image analysis system 108 can be used to analyze repetitive image data according to selector image data and verification image data received from image setup system 106.

In one exemplary embodiment, image analysis system 108 receives the selector image data and verification image data from image setup system 106, and analyzes test image data to locate the selector image data. After an occurrence of the selector image data is found in the test image data, image analysis system 108 determines whether the verification image data is present at a predetermined location according to a predetermined relationship between the selector image data and the verification image data. If the verification image data is also present in the predetermined location, then image analysis system 108 generates feature identification data, such as boundary marking data, that can be used by an operator to readily identify any improperly-identified features, and by other systems and components to inspect the area within the boundary marking data for defects, anomalies, or other unacceptable conditions.

Selector test system 124 of image analysis system 108 is used to analyze test image data to determine if selector image data is present in the test image data. Selector test system 124 uses selector image data received from selector image system 116 and test image data received from image processing system 104 to determine whether a match exists between the selector image data and the test image data. Selector test system 124 interfaces with comparator 118 so as to perform a comparison of the pixels of selector image data with the pixels of the test image data.

In one exemplary embodiment, selector test system 124 performs a normalized gray scale correlation analysis of the selector image data and the test image data. The normalized gray scale correlation provides for an image-wide adjustment between the selector image pixel data and the test image pixel data by accounting for variations in ambient and diffuse lighting conditions, which each can be represented by a constant value that is added or subtracted from the contrast values of each pixel of the test image data. The normalized gray scale correlation also provides for an image-wide adjustment between the selector image pixel data and the test image pixel data by accounting for variations caused by specular lighting conditions, such as glare and reflection, which can be represented by a multiplicative gain value by which each contrast value for pixel is adjusted. For example, the following formula may be used to compare the pixels of the selector image data with the pixels of the test image data:

$$X1 \times X2 / [X1][X2] + 1 = X3$$

wherein $X1$=selector image pixel contrast data $X2$=test image pixel contrast data $X3$=normalized pixel contrast data The output of the normalized gray scale correlation analysis can be represented as a percentage match between the two images or as other suitable values. Selector test system 124 receives the results from comparator 118 of the comparison between the selector image pixel data and the test image pixel data, and determines whether a match exists based upon a predetermined data range, which represents an acceptable degree of similarity of the selector image pixel data and the test image pixel data. If selector test system 124 determines that a match exists, verification test system 122 performs an analysis between the verification image pixel data and test image pixel data. For example, the relationship between the selector image pixel data and the verification image pixel data may be determined by image setup system 106, such that the range of locations of the test image data in which corresponding verification image pixel data should be located can be precisely determined.

Verification test system 122 compares the verification image pixel data with the test image pixel data using comparator 118. If a match is determined to exist based upon a predetermined acceptable degree of similarity between the verification image pixel data and the test image pixel data, then controller 120 is used to identify the feature, such as by generating boundary data. Controller 120 can then generate image control data for use by image selection controller 110. Likewise, if selector test system 124 determines no match exists between the selector image pixel data and the test image pixel data, controller 120 can generate the image control data without previously generating boundary data.

Image selection controller 110 can be implemented in hardware, software, or a suitable combination of hardware and software, and can be one or more software systems of a wafer location control system. For example, image selection controller 110 can control the placement of camera 102 so that camera 102 scans a silicon wafer, such as one that has been cut into a plurality of dies, so as to focus on one or more individual dies. Likewise, image selection controller 110 can control the location of a movable die support, such that the image placed in the focal field of a fixed camera 102 can be controlled such that the camera scans the plurality of dies of a silicon wafer. Other suitable control data can likewise be generated, and suitable items other than dies formed on silicon wafers can also be inspected. Image selection controller 110 receives control data from controller 120 in response to the results of data received from selector test system 124 and verification test system 122. In one exemplary embodiment, image selection controller 110 causes a die support to move in a predetermined manner such that dies formed on a silicon wafer can be examined individually.

In operation, system 100 is used to identify recurring features of image data, such as for dies formed on a silicon wafer or for other suitable purposes. In one exemplary embodiment, a die cut from a wafer includes a plurality of bond pads. Portions of the periphery of the bond pad can include variable features, such that selection of the entire bond pad as a test image for subsequent scanning of each die for bond pads would result in a large number of false positives or missed features. System 100 allows components of the feature that is being searched to be selected for testing, such that those portions of the feature in which anomalous border area data exists do not have to be tested. In this manner, repeated features of a die may be quickly identified by a suitable system, rather than requiring operator interaction to select each bond pad.

For example, a single die can contain in excess of 100 bond pads. Existing image processing systems require operators to identify each bond pad, so as to set up each wafer for inspection, a process that can take several minutes for each die, and which can also result in error as a result of operator fatigue. System 100 allows an operator to select two or more components of the feature that is to be selected for subsequent inspection, and then performs identification of features in which matches are found for the selector image data and verification image data without operator input. Thus, system 100 can perform feature identification in a fraction of the time required for operator identification, and avoids problems that can be caused by operator fatigue.

Although two feature components are described herein, a suitable number of feature components could also be used where suitable. For example, three smaller feature components could be used instead of two larger feature components, or two separate feature components could be used simultaneously in addition with a third feature component that is used in a second test step.

Figure 2:
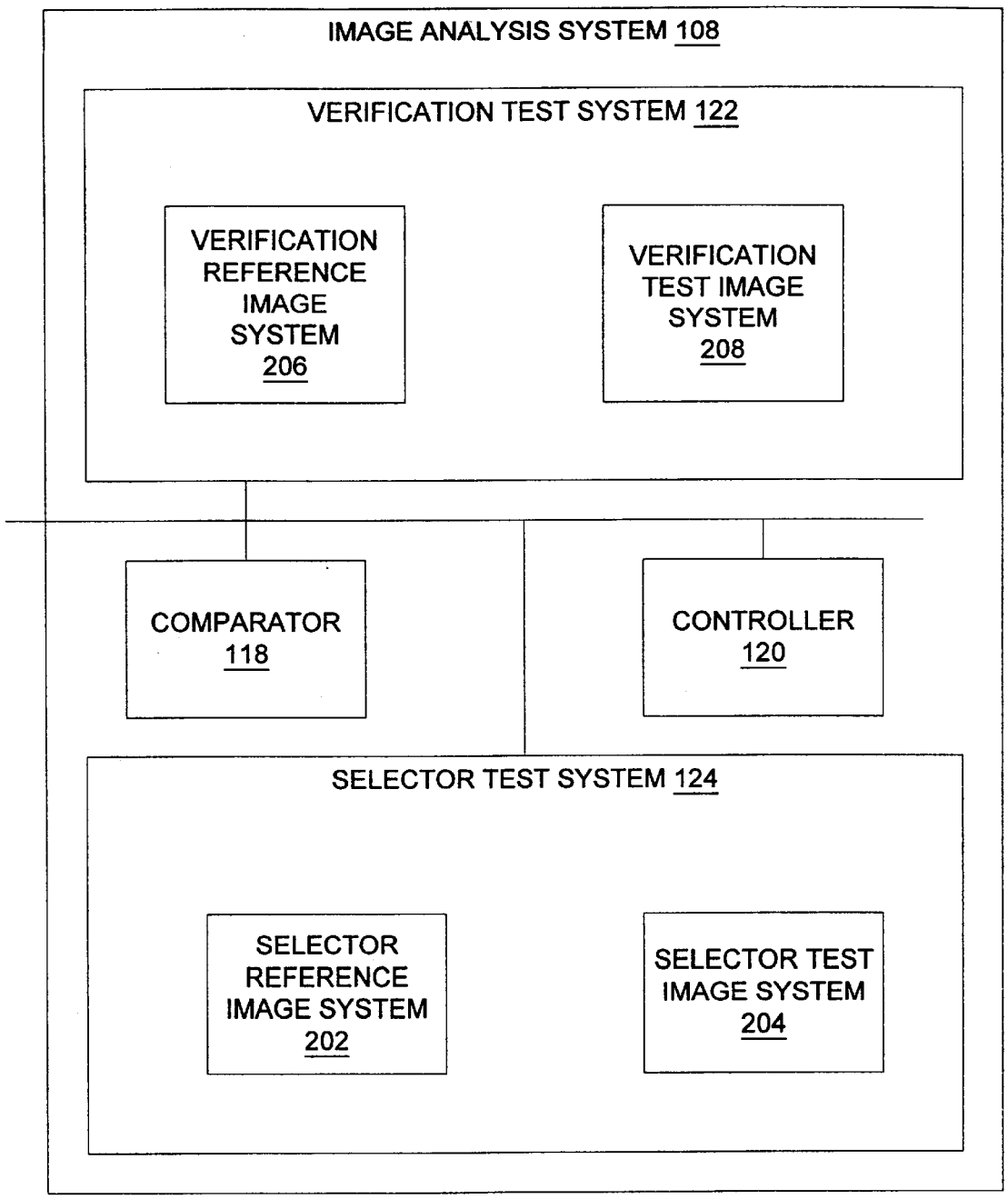
FIG. 2 is a diagram of a system for analyzing test image data in accordance with an exemplary embodiment of the present invention.

FIG. 2 is a diagram of a system 200 for analyzing test image data in accordance with an exemplary embodiment of the present invention. System 200 includes image analysis system 108 and additional systems that facilitate the analysis of test image data to identify features.

System 200 includes selector reference image system 202, which can be implemented in hardware, software, or a suitable combination of hardware and software which can be one or more software systems operating on a general purpose processor platform. Selector reference image system 202 receives selector reference image pixel data and uses the selector reference image pixel data to determine whether a match exists with selector test image pixel data. For example, selector reference image system 202 can receive selector reference image pixel data and store the selector reference image pixel data in a suitable data memory. Selector reference image system 202 can then receive suitable data, such as data from controller 120 indicating that a new selector test image data is available. Selector reference image system 202 then retrieves the selector test image pixel data from selector test image system 204, and causes comparator 118 to compare the selector reference image pixel data with the selector test image pixel data. Based upon data received from comparator 118, selector reference image system 202 then determines whether a match exists between the selector reference image pixel data and the selector test image pixel data. If a match exists, selector reference image system 202 transmits suitable data to controller 120 to cause verification test system 122 to perform a verification test. Otherwise, selector test system 124 transmits suitable data to controller 120 to generate control data to cause additional test image data to be transmitted.

Verification reference image system 206 receives control data from controller 120 and performs a verification reference image comparison with verification test image system 208. In one exemplary embodiment, verification reference image system 206 receives verification reference image pixel data from an image setup system, and causes verification test image pixel data to be transferred from verification test image system 208 to comparator 118. Based upon data received from comparator 118, verification reference image system 206 then determines whether a match exists between the verification reference image pixel data and the verification test image pixel data. If a match exists, data is transmitted to controller 120 to generate feature identification data. Otherwise, if a match does not exist, new test image data is provided for selector test image system 204.

In operation, system 200 allows features to be identified in test image data by performing a two-step feature identification test. In the first step, the first component of the feature data such as selector reference image pixel data is used to scan test image data, such as selector test image pixel data. If a match is found between the selector reference image pixel data and the selector test image pixel data, then the presence of a second component of the feature is checked for, such as verification reference image pixel data. This verification reference pixel data is compared to verification test image pixel data from a location of the test image pixel data where the verification reference pixel data should be found. If a match is found, then it is concluded that the feature has been located in the test image. Otherwise, the test data is incremented and research is repeated.

In one exemplary embodiment, a predetermined section of a 1000×1000 pixel display is scanned, such as a 10×10 pixel section, a 5×5 pixel section, or other suitable pixel sections. If it is determined that the first component of the feature is not present, the location of the pixel display in the 1000×1000 pixel array is incremented, and the test is repeated. Otherwise, it is determined whether the second component of the feature is present at a predetermined location. If the second component is present, suitable data is generated, such as boundary data. The location of the pixel array is then incremented, and the test is repeated. In this manner, controller 120 can cause each test section of the pixel array to be tested.

Figure 3:
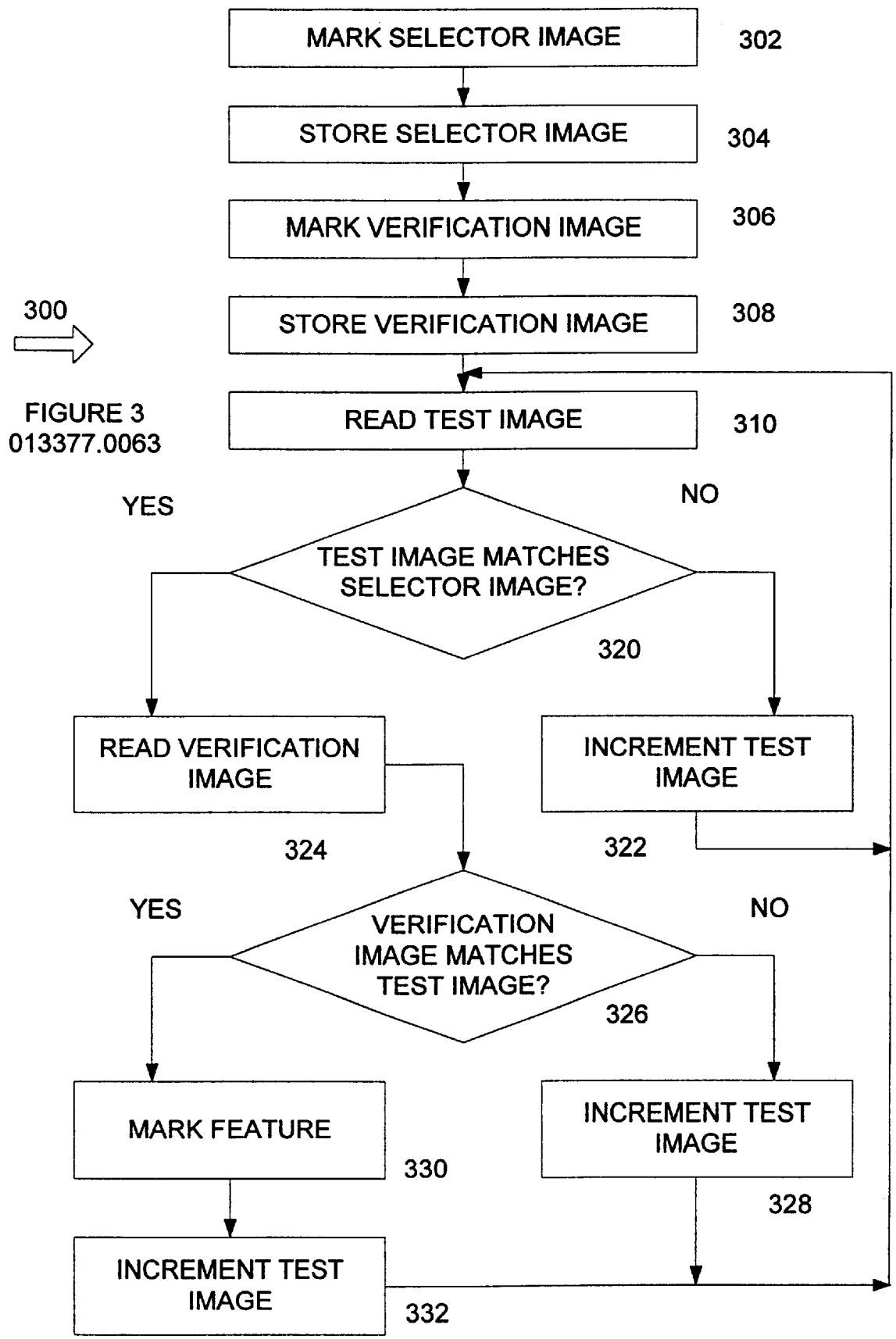
FIG. 3 is a flow chart of a method for testing image data in accordance with an exemplary embodiment of the present invention.

FIG. 3 is a flow chart of a method 300 for testing image data in accordance with an exemplary embodiment of the present invention. Method 300 begins at 302 where selector image data is marked by user. In one exemplary embodiment, the user selects pixels that form a component of a feature, such as a corner of a bond pad. The user can select a component that does not include border image data than may create a false positive or that may result in the failure to identify the feature. The method then proceeds to 304 where the selector image data is stored. The selector image data can include the user-selected pixel section from the pixel array or other suitable data, such that the contrast data corresponding to the brightness of each pixel for the component in the selector image data are stored. The method then proceeds to 306.

At 306, verification image data is marked, such as by selecting a second component of the feature that does not include border image data than may create a false positive or that may result in the failure to identify the feature. The method then proceeds to 308 where the verification image data is stored. The method then proceeds to 310 where the test image data is read. In one exemplary embodiment, a single die of a wafer is read in a 1000×1000 pixel test image, which is then analyzed in sections having a predetermined size, such as 5×5 pixel section. The method then proceeds to 320.

At 320, it is determined whether the test image matches the selector image data. In one exemplary embodiment, analysis of the test image can begin with pixel [0,0] of a 1000×1000 test image pixel array. If a 5×5 array of pixels is used, then a range of pixels bounded by the region extending from [0,0] to [5,0] to [5,5] to [0,5] and back to [0,0] can be selected. It is then determined at 320 whether the test image matches the selector image data that has been stored at step 304. If it is determined that no match exists, the method proceeds to 322 and the test image is incremented, such as by increasing the coordinates of each pixel by one, along a predetermined axis.

In one previous exemplary embodiment, the test image can be incremented from the region bounded by coordinate points [0,0]-[5,0]-[5,5]-[0,5] to the region bounded by coordinate points [1,0]-[6,0]-[6,5]-[1,5]. In this manner, the test image is "swept" in one pixel steps until the rightmost 5×5 pixel array is reached, which in the present exemplary embodiment would be the region bounded by coordinate points [996,0]-[1000,0]-[1000,5]-[996,5]. The test image would then be "swept" along the next row, such as by starting at the region bounded by [0,1]-[5,1]-[5,6]-[0,6] and ending at the region bounded by [996,1]-[1000,1]-[1000,6]-[996,6], and along subsequent rows until the entire test image has been scanned.

If it is determined at 320 that the test image data matches the selector image data, the method proceeds to 324 where the verification image data is read. The method then proceeds to 326. At 326, it is determined whether the verification image data matches the test image. The portion of the test image that is to be compared with the verification image data is selected by determining a coordinate relationship between the selector image data and the verification image data. For example, the selector image data may be contained with the pixel range [0,0]-[5,0]-[5,5]-[0,5], and the verification image data may be contained within the pixel range [10,10]-[15,10]-[15,15]-[10,15]. In this exemplary embodiment, the coordinate relationship can be used to select the verification test image data by shifting the coordinates of the test image data range that matched the selector image data by [10,10]. Thus, verification test image is selected based upon coordinate data of the selector test image and the coordinate relationship.

If it is determined at 326 that the verification image does not match the test image data, the method proceeds to 328 where the image selector is incremented, and the method returns to 310. If it is determined at 326 that a match does exist, the method proceeds to 330 where the feature is marked using predetermined feature data. In one exemplary embodiment, boundary data for the feature is determined from the user-entered selection of component data, and this boundary data is then applied to the feature that has been identified at step 326. The method then proceeds to 332 where the test image is incremented, such as in the manner previously described. The method then returns to 310.

In operation, method 300 is used to scan test image data to detect recurring features using selector image data and verification image data. Method 300 uses a two-step process to identify features of test image data, wherein two or more components of a feature are identified by user. These components are then used to scan the image for features in a manner that avoids detection of false positives from image test data, which can be caused by non-recurring image data in the border region of the feature, and also to prevent the failure to identify features, which can also be caused by non-recurring image data. In this manner, scanning of image data can be performed without operator input with minimal indication of false positives or missed features.

Figure 4:
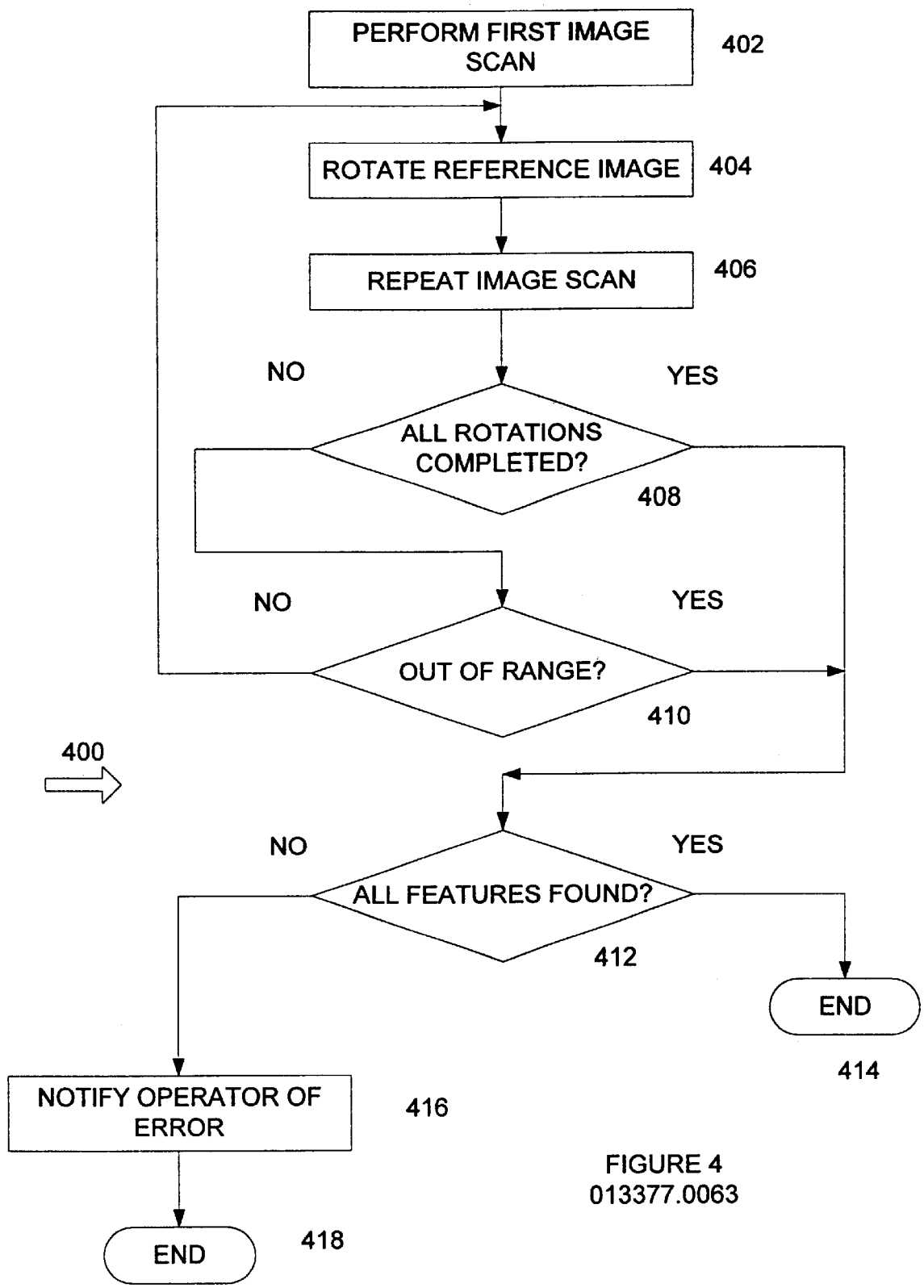
FIG. 4 is a flowchart of a method for rotating feature scans in accordance with an exemplary embodiment of the present invention.

FIG. 4 is a flowchart of a method 400 for rotating feature scans in accordance with an exemplary embodiment of the present invention. Method 400 can be used to determine whether features exist in test image data that are rotated from the orientation or plane that the reference image is located in.

Method 400 begins at 402 where a first image scan is performed. For example, the first image scan can be performed in accordance with the method shown in FIG. 3, or other suitable image scan procedures can be performed. The method then proceeds to 404.

At 404, the reference image is rotated. For example, the test image may be rotated by a predetermined horizontal-to-vertical pixel ratio, such as 10:1, 20:1, or other suitable pixel ratios. In one exemplary embodiment, if a 5×5 pixel section is scanned in a 1000×1000 pixel array, the 5×5 pixel section can be rotated by starting with the pixel section bounded by [0,0]-[5,0]-[5,5]-[0,5] and proceeding to the pixel area bounded by [0,0]-[5,1]-[4,6]-[-1,5]. This shifted pixel region can then be used to scan the 1000×1000 array by suitable incrementation. Other suitable procedures can also be used, such as by obtaining new test image data after shifting the camera or object support holding the object being scanned. The method then proceeds to 406 where the image scan is repeated. Feature identification is performed during the image scan in accordance with a suitable method, such as method 300 or other suitable methods. The method then proceeds to 408.

At 408, it is determined whether all rotations have been completed. Reference images can be rotated by a predetermined angular displacement, such as 90 degrees, or other suitable predetermined rotations. In one exemplary embodiment, bond pads are located around the periphery of a square die, such that the reference image must be shifted 90 degrees for bond pads that lie along the succeeding edge as the periphery of the die is followed. In another exemplary embodiment, a predetermined number of small angular rotations can be attempted in order to determine whether the object being scanned is slightly out of alignment. If it is determined at 408 that all rotations have not been completed, the method proceeds to 410. Otherwise, the method proceeds to 412.

At 410, it is determined whether the rotations are out of range. For example, the amount of rotation can be determined by a total angular displacement, such that once the angular displacement is exceeded, then rotation of the reference image is terminated. If it is determined at 410 that the reference image has not been rotated out of range, the method returns to 404. Otherwise, the method proceeds to 412. At 412, it is determined whether all features have been found. In one exemplary embodiment, method 400 can be used to inspect a die cut from a wafer so as to identify bond pads. In this exemplary embodiment, the number of bond pads can be known, such that if all bond pad features have not been identified, the method proceeds to 416. Otherwise, the method proceeds to 414 and terminates.

At 416, an operator is notified of an error in the identification of the features. For example, the operator can be prompted to select any missing features, can be presented with the options of re-scanning the image, selecting new components for scanning, or can receive other suitable options. The method then proceeds to 418 and terminates.

In operation, method 400 is used to identify features in test images that may have experienced angular displacement from the plane in which the reference image was formed. Method 400 allows the test image to be rotated by a predetermined amount so that features of the test image can be detected. In addition to rotation of the image by analytical means, method 400 also allows images to be physically rotated, and also provides for operator notification and correction prior to the use of the potentially deficient image data.

Figure 5:
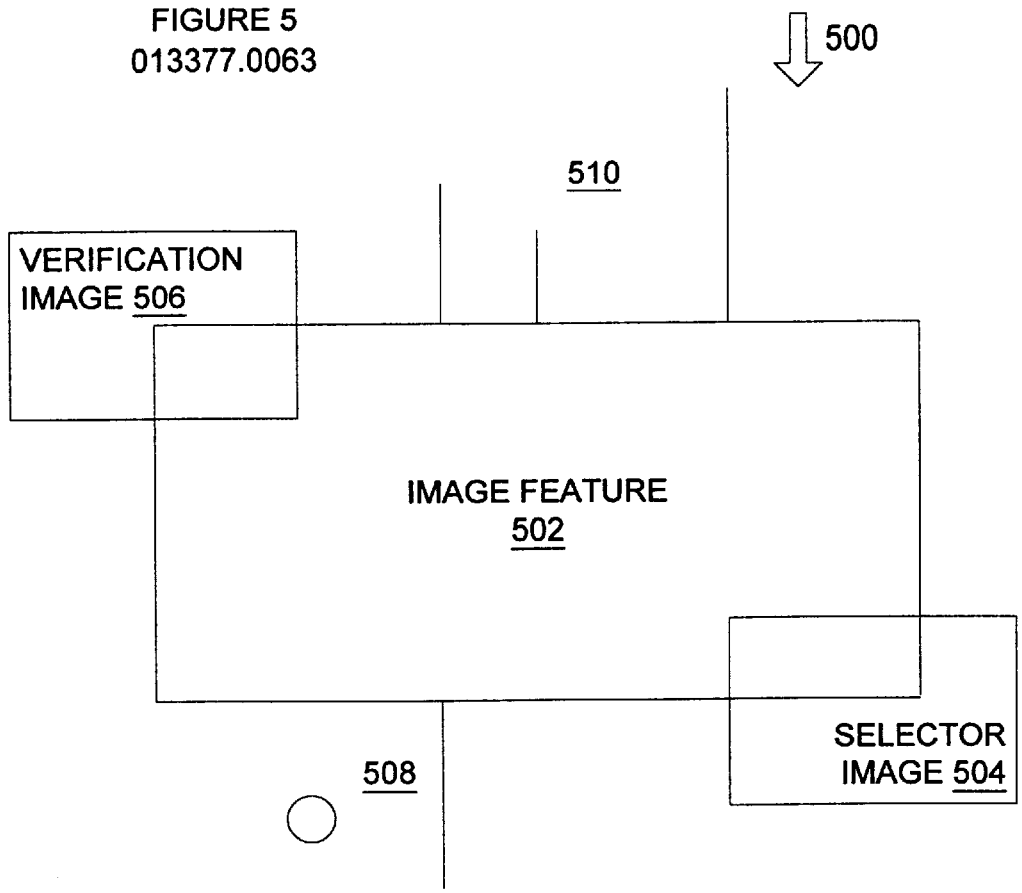
FIG. 5 is a diagram showing an exemplary selector image and verification image of a feature in accordance with an exemplary embodiment of the present invention.
Figure 5:
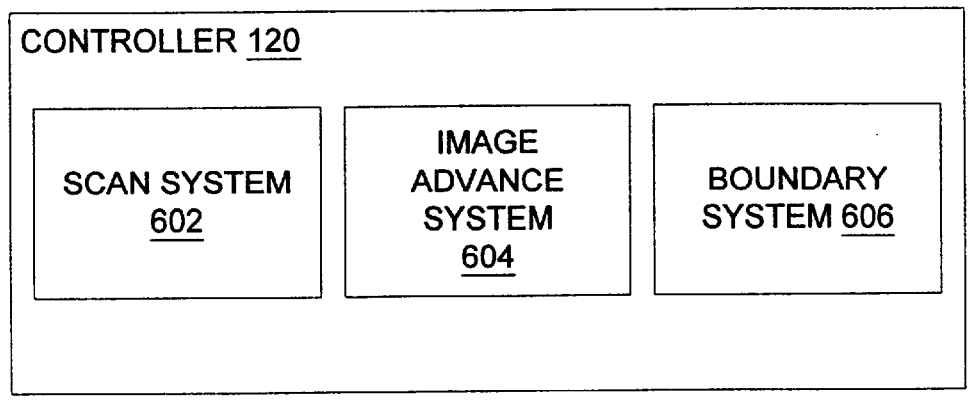

FIG. 5 is a diagram 500 showing an exemplary selector image and verification image of a feature in accordance with an exemplary embodiment of the present invention. Data derived from the selector image and verification image of diagram 500 can be used to locate other features in image data without operator input.

Diagram 500 includes image feature 502, which can be a bond pad or other suitable feature of a die, or other suitable feature of an object. The component of image feature 502 that selector image 504 focuses on is the lower right-hand corner of image feature 502. Diagram 500 also includes verification image 506, which focuses on the upper right-hand corner of image feature 502. Non-uniform features 508 and 510 of diagram 500 are variable features that can cause false positive indications, feature recognition failure, or other unacceptable readings if the entire image feature 502 and surrounding boundary area is selected as a reference image for use with a feature detection system.

Selector image 504 and verification image 506 are user-selected regions that are selected to avoid non-uniform features 508 and 510. Thus, when test image data is scanned to identify image feature 502, which is a recurring image feature contained in the test image data, the non-uniform features 508 and 510 will not cause an unacceptable reading, because selector image 504 and verification image 506 are taken from portions of image feature 502 in which the non-uniform features 508 and 510 are absent.

Although two components, the selector image and the verification image, are shown in diagram 500, additional components may also be used where suitable. For example, two components may be used simultaneously to perform a first comparison and a third component may be used to verify the selection in a second step. Likewise, based upon a known coordinate relationship between features in the image data, a positive identification of the selector image can be followed by a test for every additional expected occurrence of the selector image on other features, the verification image on other features, or other suitable components.

Figure 6:
FIG. 6 is a diagram of a system for controlling an image data analysis system in accordance with an exemplary embodiment of the present invention.

FIG. 6 is a diagram of a system 600 for controlling an image data analysis system in accordance with an exemplary embodiment of the present invention. System 600 includes controller 120 and additional functionality for the control of an image data analysis system.

System 600 includes scan system 602, image advance system 604, and boundary system 606, which can be implemented in hardware, software, or a suitable combination of software and hardware, and which can be software systems operating on a general purpose computing platform. In this exemplary embodiment, scan system 602 receives result data from selector test system 124 and verification test system 122 and generates scan control data based upon the result data. If the result data indicates that a negative comparator result was received for the comparison between selector reference image data and selector test image data, then scan system causes the selector test image data to be incremented to the next test image in a scan sequence for the image being tested, such as a die image. Scan system 602 can cause the selector test image data to increment to the next image, the image at the beginning of the next row, a rotated image, or other suitable incremented selector test images.

Scan system 602 also causes the selector test image to increment after a verification reference image data and verification test image data comparison, regardless of the result. If a positive result is received, boundary data is generated and the selector test image is incremented. Likewise, if a negative result is received, the selector test image is also incremented even though no boundary data is generated. As a result, scan system 602 only requires data indicating that the verification reference image data and the verification test image data comparison has been completed.

Image advance system 604 tracks the number of features that have been found and the completion status of the scan of an image, and causes the test image for a new device, object, or other item to be acquired after the scan of a test image has been completed. In this exemplary embodiment, one test image may be scanned of an object, such as a die cut from a silicon wafer. The object may then be scanned to identify repetitive features, such as bond pads. In this exemplary embodiment, image advance system 604 can cause the next die of the silicon wafer to be scanned after all of the bond pads of the current die have been located, after the entire test image of the current die has been scanned, or as otherwise suitable.

Boundary system 606 generates boundary data after a selector image has been found and a corresponding verification image has been found. In this exemplary embodiment, the positive identification of a selector image and a verification image results in the expected location of the boundary for the feature. Boundary system 606 can generate the boundary, either with additional analysis and verification of the image data or so as to provide the operator with an indication for subsequent operator review.

In operation, system 600 provides image data processing capabilities in response to the results of comparisons between selector reference image data and selector test image data, and verification reference image data and verification test image data. System 600 allows image data scanning to be controlled, image data advance to be controlled, and creation of boundary data to be controlled in a centralized controller. Functionality of system 600 can also be distributed or included in other suitable systems or components of an image data analysis system, where suitable.

Although preferred and exemplary embodiments of a system and method for locating image features have been described in detail herein, those skilled in the art will also recognize that various substitutions and modifications can be made to the systems and methods without departing from the scope and spirit of the appended claims.

What is claimed is:

1. A method for locating areas of interest in a set of image data comprising:

identifying a feature that is expected to be present in each set of image data;

generating image data of the feature;

identifying a boundary of an inspection area;

determining a spatial relationship of the boundary to the feature;

receiving an inspection set of image data;

comparing the feature image data to a subset of the inspection image data;

incrementing the coordinates of the subset of the inspection image data if the feature image data does not match the subset of the inspection image data;

repeating the comparing and incrementing steps until a match is found;

using the spatial relationship to place the boundary of the inspection area in the inspection set of image data; and using the boundary of the inspection area to select a subset of the inspection set of image data for subsequent analysis.

2. The method of claim 1 further comprising:

identifying a second feature that is expected to be present in each set of image data;

generating image data of the second feature;

determining a spatial relationship of the first feature to the second feature;

using the spatial relationship of the first feature to the second feature to confirm the location of the boundary.

3. The method of claim 2 wherein the first feature is a section of a bond pad and the second feature is a different section of the bond pad.

4. The method of claim 2 wherein determining the spatial relationship of the first feature to the second feature comprises:

determining pixel coordinates for one or more pixels of the first feature;

determining pixel coordinates for one or more pixels of the second feature; and determining the difference between the pixel coordinates for the one or more pixels of the first feature and the one or more pixels of the second feature.

5. The method of claim 1 wherein the boundary of the inspection area is a boundary of a bond pad.

6. The method of claim 5 further comprising identifying the boundary of each bond pad of a semiconductor die.

7. The method of claim 1 wherein the feature is a section of a bond pad.

8. The method of claim 1 wherein determining the spatial relationship of the boundary to the feature comprises:

determining pixel coordinates for one or more pixels of the feature;

determining pixel coordinates for one or more pixels of the boundary; and determining the difference between the pixel coordinates for the one or more pixels of the feature and the one or more pixels of the boundary.

9. A system for locating areas of interest in sets of image data comprising a selector test system comparing selector image data to a subset of test image data and generating first match data if a match is detected, otherwise incrementing the coordinates of the subset of test image data and repeating the comparison of the selector image to the subset of test image data until the match is detected;

a controller receiving the first march data and generating boundary data;

an image analysis system receiving the boundary data and selecting a set of pixel data for analysis; and a verification test system receiving the first match data, comparing verification image data to the test image data based on a predetermined spatial relationship, and generating second match data, wherein the controller receives the first match data and the second match data and generates the boundary data.

10. The system of claim 9 further comprising a selector image system receiving a user-selected selector image and storing the selector image for use in analyzing image data.

11. The system of claim 9 further comprising a verification image system receiving a user-selected verification image and storing the verification image for use in analyzing image data.

12. The system of claim 9 further comprising an image setup system receiving component data that includes boundary data.

13. The system of claim 9 further comprising an image analysis system receiving the boundary data and generating a user-readable display that includes boundary marking data that allows an operator to see the boundary data.

* * * * *